United States Patent
Park et al.

(10) Patent No.: US 6,788,631 B1
(45) Date of Patent: Sep. 7, 2004

(54) OPTICAL RECORDING MEDIUM HAVING RECORDING CAPACITY INFORMATION AND METHOD FOR INDICATING RECORDING CAPACITY

(75) Inventors: Yong Cheol Park, Kyonggi-do (KR); Kyu Hwa Jeong, Kyonggi-do (KR)

(73) Assignee: LC Electronics Inc., Seoul (KR)

( * ) Notice: Subject to any disclaimer, the term of this patent is extended or adjusted under 35 U.S.C. 154(b) by 0 days.

(21) Appl. No.: 09/387,853

(22) Filed: Sep. 1, 1999

(30) Foreign Application Priority Data

Sep. 2, 1998 (KR) .............................. 98-36150
Nov. 20, 1998 (KR) .............................. 98-49937

(51) Int. Cl.[7] ................................. G11B 7/00
(52) U.S. Cl. ..................................... 369/53.15
(58) Field of Search ...................... 369/32, 53.12, 369/53.15, 53.17, 53.42, 59.25

(56) References Cited

U.S. PATENT DOCUMENTS

| | | | | |
|---|---|---|---|---|
| 4,939,598 A | * | 7/1990 | Kulakowski et al. | 369/48 |
| 5,111,444 A | * | 5/1992 | Fukushima et al. | 369/32 |
| 5,303,219 A | * | 4/1994 | Kulakowski et al. | 369/54 |
| 5,319,627 A | * | 6/1994 | Shinno et al. | 369/32 |
| 5,617,383 A | * | 4/1997 | Matsumoto et al. | 369/58 |
| 5,648,954 A | * | 7/1997 | Satoh | 369/54 |
| 5,745,444 A | * | 4/1998 | Ichikawa et al. | 369/32 |
| 5,745,459 A | * | 4/1998 | Inokuchi et al. | 369/54 |
| 5,799,212 A | * | 8/1998 | Ohmori | 369/54 |
| 5,805,550 A | * | 9/1998 | Ohmori | 369/58 |
| 5,867,466 A | * | 2/1999 | Igarashi et al. | 369/58 |
| 6,034,831 A | * | 3/2000 | Dobbek et al. | 369/58 |
| 6,160,778 A | * | 12/2000 | Ito et al. | 369/54 |
| 6,469,978 B1 | * | 10/2002 | Ohata et al. | 369/53.17 |
| 6,510,114 B1 | * | 1/2003 | Yeo et al. | 369/53.17 |

FOREIGN PATENT DOCUMENTS

| | | | | |
|---|---|---|---|---|
| JP | 2-257328 | * | 10/1990 | 369/48 |
| JP | 8-279234 | * | 10/1996 | 369/48 |

* cited by examiner

*Primary Examiner*—Nabil Hindi
(74) *Attorney, Agent, or Firm*—Birch, Stewart, Kolasch & Birch, LLP

(57) ABSTRACT

Optical recording medium having an indication of a recording capacity, and method for indicating a recording capacity of an optical recording medium facilitates recording or reproducing of an accurate amount of data by indicating the initial recording capacity determined by default and the varied recording capacity by additional allocation of the spare area and the like on particular area of the optical recording medium, and conducting the data writing or reading with reference to the initial recording capacity or the varied recording capacity depending on a state of variation of the recording capacity.

33 Claims, 7 Drawing Sheets

FIG.3
Related Art related sector number

| 0 | physical format information |
|---|---|
| 1 | disk fabrication information |
| 2 | |
| : | unused |
| 15 | |

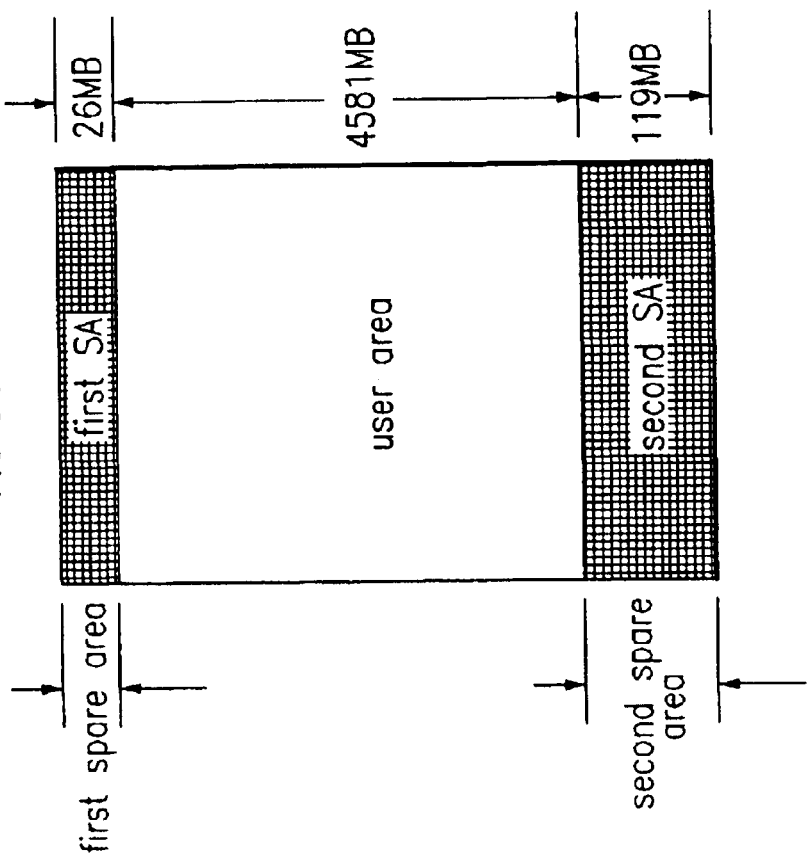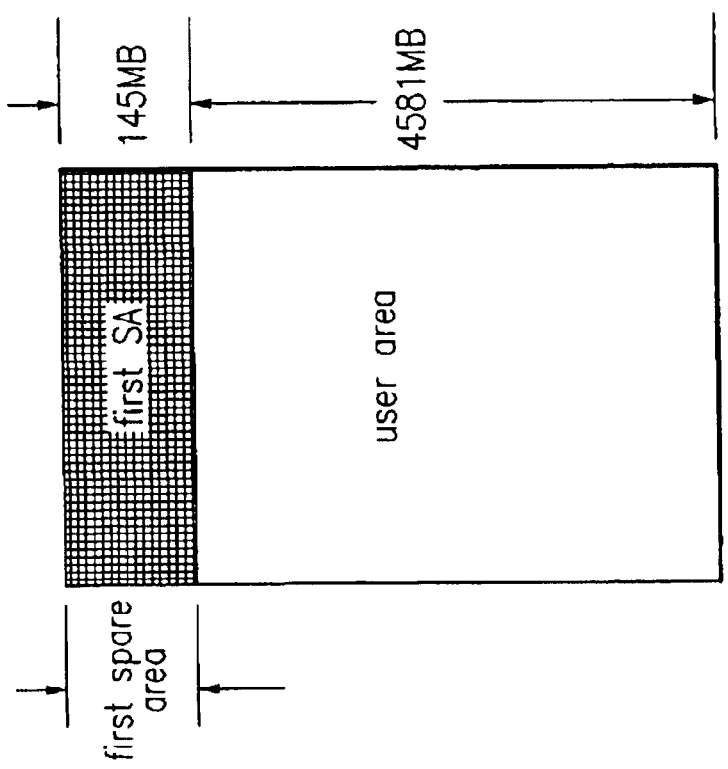

FIG.5A initial recording capacity

FIG.5B varied recording capacity identification
information

0b   :  mode-1 (4.58GB)

1b   :  mode-2 (4.7GB)

OPTICAL RECORDING MEDIUM HAVING RECORDING CAPACITY INFORMATION AND METHOD FOR INDICATING RECORDING CAPACITY

BACKGROUND OF THE INVENTION

1. Field of the Invention

The present invention relates to a rewritable optical recording medium system, and more particularly, to an optical recording medium having an indication of a recording capacity, and a method for indicating a recording capacity of an optical recording medium.

2. Background of the Invention

In general, the optical recording media are sorted as a ROM type for read only, a WORM type for writing once, and a rewritable type for repetitive writing. In disks which are rewritable freely and repetitively, there are CD-RW (Rewritable Compact Disc), and rewritable digital versatile disc(DVD-RW, DVD-RAM, DVD+RW).

FIG. 1 illustrates an architecture of the rewritable optical disk, provided with, starting from inside, a lead-in area, a data area, and a lead-out area. The data area is divided into zone units for random access, each zone provided with a user area and a spare area for use when a defect is occurred in the user area.

Referring to FIG. 2, the lead-in area is provided with an embossed data zone, a mirror zone, and a rewritable data zone. The embossed data zone, an area preformatted in the disk fabrication process, has a recorded data change of which is impossible. The embossed data zone in turn is provided with a blank zone, a reference signal zone, a blank zone, a control data zone, and a blank zone. The control data zone contains an embossed data field, and the data field contains embossed control data. The control data has 192 ECC (error correction code) blocks, and each ECC block has 16 sectors. A first sector in each block contains physical format information, a second sector contains disk manufacturing information, and the rest of the sectors are left unused. And, the rewritable data zone, an area provided for rewriting control information varied with data rewriting, has a protection track zone, a disk test zone, a drive test zone, a protection track zone, a disk ID (identification) zone, and defect management areas (DMA1 & DAM2) for managing defects in the disk. The optical disk has a variety of recording capacities, such as 2.6 G (giga byte), 4.58 G, 4.7 G, and etc., determined according to track pitches which are distances between pit lines.

However, the recording capacity of a disk may differ even if the track pitch and a size of the disk (for example, 8 cm or 12 cm) are identical. For example, if a spare area in a data area is employed as a user area according to a disk manufacturing process or reformatting, or according to a size of a spare area allocated, the recording capacity of the disk may differ even if the track pitch or the disk size is identical. The spare area may be fixed or varied by enlargement as necessary. Herein, one example of the disk in which the spare area is fixed is called a mode-1, and one example of the disk in which the spare area is varied by enlargement or extension is called a mode-2. In the case of mode-1, for setting an initial data recording capacity (a user area) to be 4.58 GB, the spare area is allocated to be 145 MB (=mega byte) every time. In the mode-1, the 145 MB of the spare area may be allocated on top of the user area entirely as shown in FIG. 4A, or divided to top and bottom of the user area as shown in FIG. 4B, when 25 MB may be allocated to the top and the rest is allocated to the bottom by taking interchangeability with the mode-2 into consideration. The spare area allocated to the top is called as a primary spare area (first SA), and the spare area allocated to the bottom is called as a supplementary spare area (second SA). In the case of mode-2, in order to set an initial data recording capacity (i.e., a user area) to be 4.7 GB, 26 MB is allocated as the spare area. In this instance, as shown in FIG. 4C, the 26 MB is assigned to the first spare area in formatting, a second spare area may be allocated to the bottom additionally as necessary, or may be enlarged. In every one of the foregoing operations, the recording capacity of the disk is varied. In those instances, the disk recording capacity can not be known only from a size of track pitch or disk, which impedes recording or reproduction of an accurate amount of data.

SUMMARY OF THE INVENTION

Accordingly, the present invention is directed to an optical recording medium having an indication of a recording capacity, and a method for indicating a recording capacity of an optical recording medium that substantially obviates one or more of the problems due to limitations and disadvantages of the related art.

An object of the present invention is to provide an optical recording medium having an indication of a recording capacity at a particular area thereof.

Other object of the present invention is to provide a method for indicating a recording capacity of an optical recording medium, which can indicate an initial recording medium of the recording medium at a particular area of the optical recording medium and can indicate a changed recording capacity if the recording capacity is changed.

Another object of the present invention is to provide a method for indicating a recording capacity of an optical recording medium, in which identification information for indicating a recording capacity of the optical recording medium is provided at a particular area of the optical recording medium for indicating an initial recording capacity of the optical recording medium.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the optical recording medium has a recording capacity indicated on a particular area of a rewritable optical recording medium.

The recording capacity is indicated on an unused area of a lead-in area.

The recording capacity includes an initial recording capacity and a varied recording capacity of the optical recording medium.

The initial recording capacity of the optical recording medium is indicated by identification information.

In other aspect of the present invention, there is provided a method for indicating a recording capacity of a rewritable optical recording medium, including the steps of indicating an initial recording capacity on a particular area of the optical recording medium, and indicating a varied recording capacity, if the recording capacity is varied.

The varied recording capacity is overwritten on the initial recording capacity.

The varied recording capacity and the initial recording capacity are indicated at positions different from each other, and a fact of variation of the recording capacity is indicated.

The initial recording capacity of the optical recording medium is indicated with identification information added thereto.

In another aspect of the present invention, there is provided a method for indicating a recording capacity of an optical recording medium which indicates the recording capacity of the optical recording medium as identification information, the recording capacity being varied with a variability of spare area.

The identification information is changed whenever the spare area is varied.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 3 illustrates an architecture of a control block in the control data zone in FIG. 2;

FIGS. 4A~4C illustrate allocation examples of a first spare area and a second spare area in a related art optical recording medium depending on modes;

FIG. 5A illustrates an example of an initial recording capacity, which is determined by default, indicated in an unused area of a control data zone in the lead-in area in a method for indicating a recording capacity according to an embodiment of the present invention;

FIG. 5B illustrates an example of a variable recording capacity indicated in an unused area of a rewritable data zone in the lead-in area in a method for indicating a recording capacity according to an embodiment of the present invention; and, FIG. 6 illustrates an example of an initial recording capacity, which is determined by default, indicated by using identification information in a method for indicating a recording capacity according to an embodiment of the present invention.

DETAILED DESCRIPTION OF THE PREFERRED EMBODIMENTS

Figure 1:
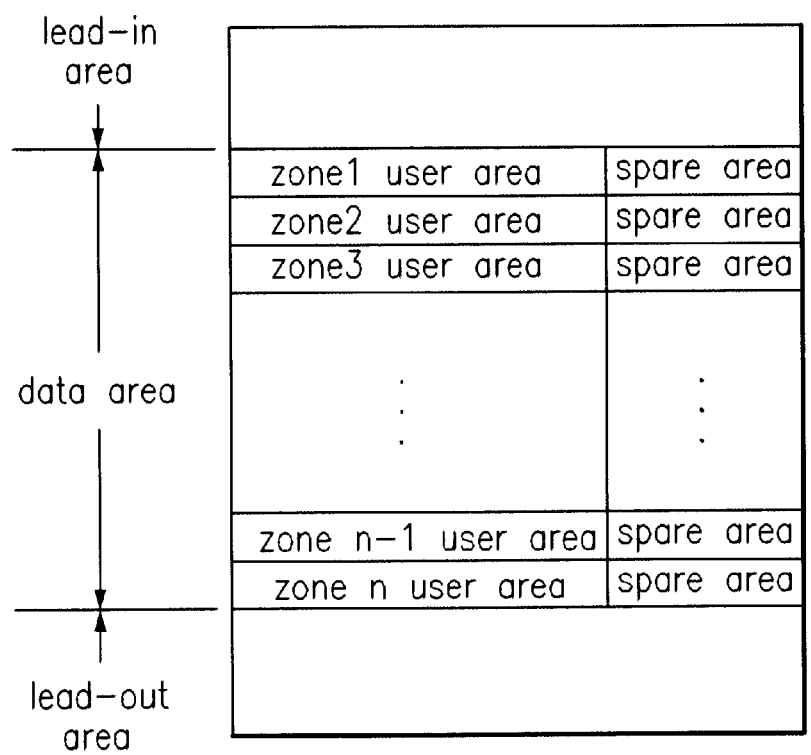
FIG. 1 illustrates an architecture of a related art rewritable optical disk.
Figure 2:
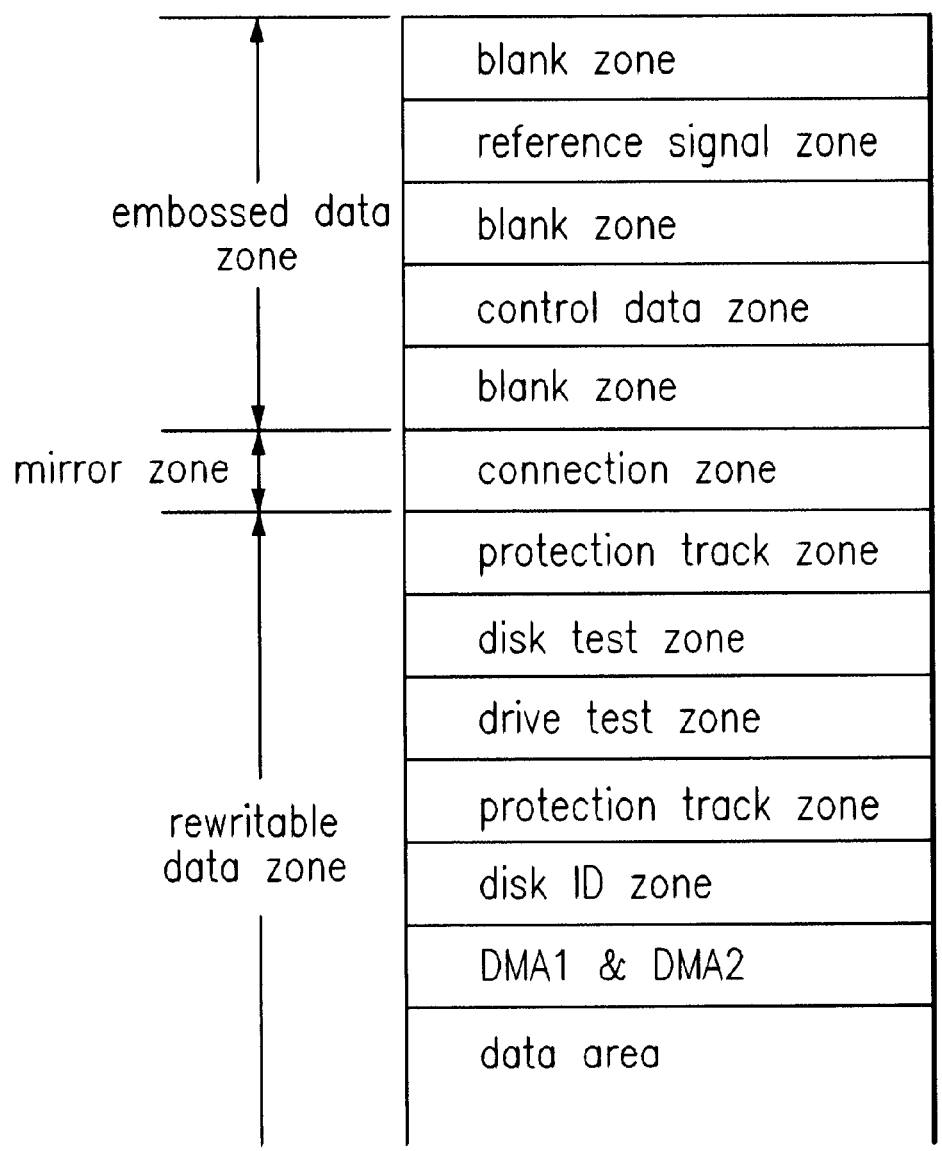
FIG. 2 illustrates an architecture of a lead in area shown in FIG. 1.
Figure 4C:
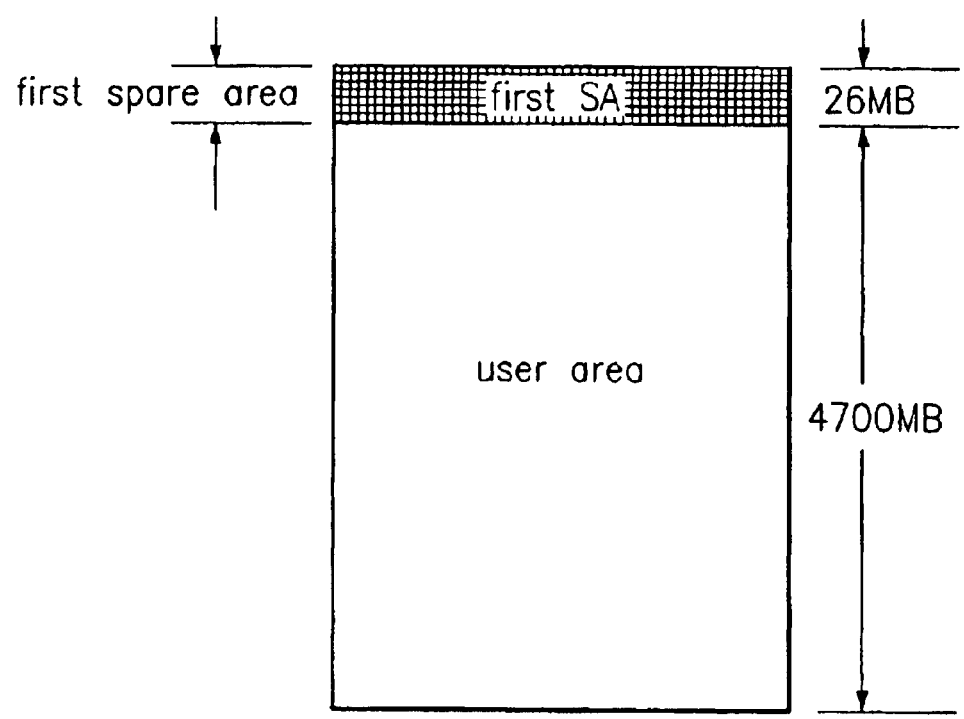

Reference will now be made in detail to the preferred embodiments of the present invention, examples of which are illustrated in the accompanying drawings. The present invention indicates an initial recording capacity (or a recording capacity determined by default), and a varied recording capacity if the recording capacity is varied. The initial recording capacity may be determined by the manufacturer or the user. The initial recording capacity is indicated in a particular area of the optical disk, for example, in the lead-in area. In this instance, the initial recording capacity may be indicated in an unused area of an embossed data zone, or a rewritable data zone of the lead-in area. In the case the initial recording capacity is indicated in the embossed data zone of the lead-in area according to the present invention, as shown in FIG. 5A, the initial recording capacity can be indicated, for example, on unused bytes (such as bytes, of BP 17~31, or 33~47) of a first sector containing physical format information among control data blocks in the control data zone of the embossed data zone.

The recording capacity may be varied with the user's reformatting, or an additional allocation of spare areas (for example, like mode-2). That is, if a spare area is formatted into a user area, the recording capacity of the disk can be increased. Or, the disk recording capacity may be reduced by allocating a spare area as the case demands. Therefore, preferably a changed recording capacity may not be indicated in an unused area in the embossed data zone of the lead-in area, because a data written on the embossed data zone in the lead-in area is not correctable. Instead, as shown in FIG. 5B, the variable recording capacity may be indicated on a disk ID zone or an unused area of DMA area in the rewritable data zone. In a case when the initial recording capacity of the optical disk is indicated on the rewritable data zone, the recording capacity varied thereafter can be overwritten on the same position. Once such an optical disk recording/reproduction is selected, recording/reproduction may be conducted with reference to the recording capacity indicated on the unused area of the rewritable data zone without variation of the recording capacity, separately. For example, if the recording capacity is indicated to be 4.7 G, data may be recorded or reproduced as much as 4.7 G, or if the recording capacity is indicated to be 4.58 G, data may be recorded or reproduced as much as 4.58 G.

If the initial recording capacity and the varied recording capacity of the optical disk are indicated at positions different from each other, the initial recording capacity or the varied recording capacity may be referred to depending on the fact of variation of the recording capacity. That is, the initial recording capacity may be indicated on the embossed data zone in the lead-in area, and the varied recording capacity may be indicated on the rewritable data zone separately, or the initial recording capacity and the varied recording capacity may be indicated at different positions of the rewritable data zone, respectively. In this instance, the fact of variation of the recording capacity may be indicated by using another additional information, or the fact of variation of the recording capacity may be made identifiable by displaying the recording capacity with a value (for example, minimum or maximum) indicating that the recording capacity is not varied until the recording capacity is varied, and by indicating the varied recording capacity on the area in which the varied recording capacity is to be indicated, if the recording capacity is varied.

Once such an optical disk recording/reproduction is selected, variation of the recording capacity is checked with reference to the area where the additional information or the varied recording capacity is indicated. If it is found that the recording capacity is not varied, the initial recording capacity (for example, the recording capacity written in the embossing data zone in the lead-in area) is read in data writing or reading. If it is found that the recording capacity is varied, the varied recording capacity (for example, the recording capacity recorded in the rewritable data zone in the lead-in area) is read in data writing or reading. For example, if the initial recording capacity is 4.7 G, and the spare area is allocated as necessary to reduce the recording capacity down to 4.58 G, data as much as 4.7 G can be recorded or reproduced until a variation of the recording capacity, and data as much as 4.58 G can be recorded or reproduced after the variation of the recording capacity.

Figure 6:
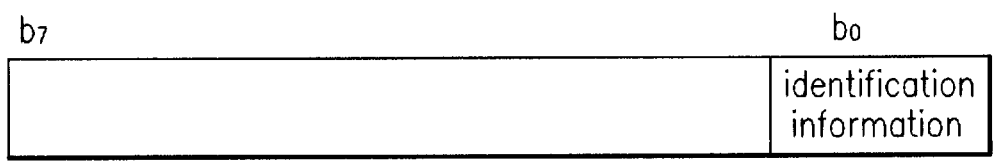

In the meantime, the initial recording capacity of the optical disk may be indicated by using identification information. That is, as shown in FIG. 6, the initial recording capacity may be indicated with the identification information added to a particular area (for example, DMA in the lead-in area, especially, unused areas of SDL or DDS). For example, if the optical disk is formatted in, or converted to mode-1, the identification information is reset to '0', and if the optical disk is formatted in, or converted to mode-2, the identification information is set to '1'. Reset of the identification information to '0' implies that the optical disk has a fixed recording capacity without variation of the spare area, and the identification information set at '1' implies that the optical disk has a varied recording capacity as the spare area is enlarged as necessary. Accordingly, if the identification information is '0' in recording/reproduction, the mounted optical disk is determined to be in mode-1, and up to 4.58 G data may be written or read. And, if the identification information is '1' in recording/reproduction, the mounted optical disk is in mode-2, and up to 4.7 G data may be written or read. Thus, a disk capacity, i.e., kind of disks dependent on the disk capacity, can be known.

As has been explained, the optical recording medium having an indication of a recording capacity, and the method for indicating a recording capacity of an optical recording medium of the present invention facilitates recording or reproducing of an accurate amount of data by indicating the initial recording capacity determined by default and the varied recording capacity by additional allocation of the spare area and the like on particular areas of the optical recording medium. The present invention allows a data writing or reading with reference to the initial recording capacity or the varied recording capacity depending on a state of variation of the recording capacity. The present invention also facilitates a mode selection and mode conversion and an accurate amount of data recording or reproducing even if the initial size of the first spare area in the mode-1 and mode-2 is the same by indicating the initial recording capacity with the identification information and performing the data recording or reproducing operation with reference to the identification information.

It will be apparent to those skilled in the art that various modifications and variations can be made in the optical recording medium having an indication of a recording capacity and the method for indicating a recording capacity of an optical recording medium of the present invention without departing from the spirit or scope of the invention. Thus, it is intended that the present invention cover the modifications and variations of this invention provided they come within the scope of the appended claims and their equivalents.

What is claimed is:

1. An optical recording medium having a user area and a spare area, the optical recording medium comprising:
   a recording capacity indicated on a particular area of the optical recording medium, wherein the recording capacity includes an initial recording capacity indicated on a particular area of the optical recording medium, wherein the initial recording capacity pertains to the user area of the optical recording medium, and the initial recording capacity is varied based upon at least one of an assignment or expansion of the spare area for defect management, the spare area being assigned to an inner area and/or an outer area of the optical recording medium, or being expanded toward an inner direction from the outer area, and
   wherein the indicated recording capacity is updated to correspond to the varied recording capacity when the initial recording capacity is varied.

2. An optical recording medium as claimed in claim 1, wherein the varied recording capacity is indicated on a rewritable area of a lead-in area of the optical recording medium.

3. An optical recording medium as claimed in claim 1, wherein the initial recording capacity of the optical recording medium is indicated by identification information.

4. A method for indicating a recording capacity of an optical recording medium having a user area and a spare area, the method comprising the steps of:
   indicating an initial recording capacity on a particular area of the optical recording medium; and
   indicating a varied recording capacity on the particular area of the optical recording medium, if the recording capacity of the optical recording medium is varied, wherein the indicated initial recording capacity is updated as the varied recording capacity indication pertaining to the user area when the recording capacity is varied based upon at least one of an assignment or expansion of the spare area for defect management, the spare area being assigned to an inner area and/or an outer area of the optical recording medium, or being expanded toward an inner direction from the outer area.

5. A method as claimed in claim 4, wherein the varied recording capacity is indicated on a rewritable or recordable data zone in a lead-in area of the optical recording medium.

6. A method as claimed in claim 4, wherein the varied recording capacity of the optical recording medium is indicated with identification information added thereto.

7. An optical recording medium as claimed in claim 1, wherein the recording capacity is indicated on an area of a rewritable data zone of the optical recording medium.

8. An optical recording medium as claimed in claim 1, wherein the recording capacity indicates a recording capacity of the entire optical recording medium.

9. A method as claimed in claim 4, wherein the varied recording capacity indicates a recording capacity of the entire optical recording medium.

10. An optical recording medium having a user area and a spare area, the optical recording medium comprising:
    a lead-in area which includes an embossed area and a rewritable or recordable area;
    a data area for recording data therein;
    a lead-out area; and
    a recording capacity information to indicate a capacity of the user area, wherein the recording capacity information is recorded on a particular area of the optical recording medium, and includes a value being varied based upon at least one of an assignment or expansion of the spare area for defect management, the spare area being assigned to an inner area and/or an outer area of the optical recording medium, or being expanded toward an inner direction from the outer area.

11. An optical recording medium as claimed in claim 10, wherein the recording capacity information is recorded on the rewritable area of the lead-in area of the optical recording medium.

12. An optical recording medium as claimed in claim 10, wherein the recording capacity information is indicated by an identification information added thereto.

13. An optical recording medium as claimed in claim 10, wherein the recording capacity information is indicated on an area of a rewritable or recordable data zone of the optical recording medium.

14. An optical recording medium as claimed in claim 10, wherein the recording capacity information indicates a recording capacity of the entire optical recording medium.

15. An optical recording medium as claimed in claim 10, wherein the recording capacity information indicates a recording capacity of the optical recording medium except for at least a capacity of the spare area.

16. A method for indicating a recording capacity of an optical recording medium having a user area and a spare area, said spare area including at least a primary spare area assigned to an inner area of the optical recording medium, the method comprising the steps of:

determining whether a supplementary spare area is assigned to an outer area of the optical recording medium or a size of the supplementary spare area is varied during a formatting process or during a recording mode; and indicating a varied recording capacity pertaining to the user area on a particular area of the optical recording medium, based upon a result of said determining step.

17. A method as claimed in claim 16, wherein the particular area is rewritable or recordable data zone of a lead-in area of the optical recording medium.

18. A method as claimed in claim 16, wherein the varied recording capacity of the optical recording medium is indicated with identification information added thereto.

19. A method as claimed in claim 16, wherein the recording capacity indicates a recording capacity of the entire optical recording medium.

20. A method as claimed in claim 18, further comprising: indicating a varied identification information based on the varied recording capacity.

21. An optical recording medium having a user area and a spare area, said spare area including a primary spare area and a supplementary spare area, the optical recording medium comprising:

a recording capacity information indicted on a particular area of the optical recording medium, wherein the recording capacity information includes a variable recording capacity information indicated on a particular area of the optical recording medium, wherein the variable recording capacity information pertains to the user area and is varied based upon at least variance with respect to a size of the supplementary spare area for defect management, the supplementary spare area being varied toward an inner direction from an outer area of the optical recording medium.

22. An optical recording medium having a user area and a spare area, said spare area including at least a primary spare area assigned to an inner area of the optical recording medium, the optical recording medium comprising:

a recording capacity information indicted on a particular area of the optical recording medium, wherein the recording capacity information includes a variable recording capacity information indicated on the particular area of the optical recording medium, wherein the variable recording capacity information pertains to the user area and is varied based upon at least an existence of a supplementary spare area for defect management, the supplementary spare area being assigned to an outer area of the optical recording medium.

23. An optical recording medium comprising:

a lead-in area which includes an embossed area and a rewritable or recordable area;

a data area for data to be written or read, the data area including a first spare area assignable to an inner area of the data area and a second spare area assignable to an outer area of the data area;

a lead-out area; and a recording capacity information which indicates a capacity of a user area of the data area, wherein the recording capacity information is recorded on a particular area of the optical recording medium, and includes a value being varied based upon at least one of an existence of the second spare area or variance with respect to a size of the second spare area for defect management, the second spare area existing in the outer area or being varied toward an inner direction from the outer area.

24. A method for indicating a recording capacity of an optical recording medium having a user area and a spare area, said spare area including a primary spare area and a supplementary spare area, the primary spare area being assigned to an inner area of the optical recording medium, the supplementary spare area being assigned to an outer area of the optical recording medium or being expanded toward an inner direction from the outer area, the method comprising the steps of:

determining whether a size of the supplementary spare area is varied during a formatting process or during a recording mode; and recording a varied recording capacity information pertaining to the user area on a particular area of the optical recording medium, based upon a result of said determining step.

25. A method for indicating a recording capacity of an optical recording medium having a user area and a spare area, said spare area including a primary spare area and a supplementary spare area, the primary spare area being assigned to an inner area of the optical recording medium, the supplementary spare area being assigned to an outer area of the optical recording medium or being expanded toward an inner direction from the outer area, the method comprising the steps of:

reading a variable recording capacity information pertaining to the user area from a particular area of the optical recording medium, the variable recording capacity being varied if a size of the supplementary spare area is varied during a formatting process or during a recording mode; and controlling a data reading or writing operation based on the read variable recoding capacity information.

26. An optical recording medium as claimed in claim 1, wherein the recording capacity indicates a recording capacity of the optical recording medium except for at least a capacity of the spare area.

27. A method as claimed in claim 4, wherein the varied recording capacity indicates a recording capacity of the optical recording medium except for at least a capacity of the spare area.

28. A method as claimed in claim 16, wherein the varied recording capacity indicates a recording capacity of the optical recording medium except for at least a capacity of the supplementary spare area.

29. An optical recording medium as claimed in claim 21, wherein the recording capacity information indicates a recording capacity of the optical recording medium except for at least a capacity of the supplementary spare area.

30. An optical recording medium as claimed in claim 22, wherein the recording capacity information indicates a recording capacity of the optical recording medium except for at least a capacity of the supplementary spare area.

31. An optical recording medium as claimed in claim 23, wherein the recording capacity information indicates a recording capacity of the optical recording medium except for at least a capacity corresponding to the size of the second spare area.

32. A method as claimed in claim 24, wherein the recording capacity information indicates a recording capacity of the optical recording medium except for at least a capacity corresponding to the size of the supplementary spare area.

33. A method as claimed in claim 25, wherein the recording capacity information indicates a recording capacity of the optical recording medium except for at least a capacity corresponding to the size of the supplementary spare area.

* * * * *